US012567691B2

(12) United States Patent
Kimura

(10) Patent No.: US 12,567,691 B2
(45) Date of Patent: Mar. 3, 2026

(54) CONNECTOR

(71) Applicant: Japan Aviation Electronics Industry, Limited, Tokyo (JP)

(72) Inventor: Akira Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 411 days.

(21) Appl. No.: 18/217,797

(22) Filed: Jul. 3, 2023

(65) Prior Publication Data

US 2024/0047913 A1 Feb. 8, 2024

(30) Foreign Application Priority Data

Aug. 4, 2022 (JP) ................................ 2022-124627

(51) Int. Cl.
*H01R 13/05* (2006.01)
*H01R 12/77* (2011.01)

(52) U.S. Cl.
CPC ......... *H01R 13/052* (2013.01); *H01R 12/777* (2013.01)

(58) Field of Classification Search
CPC .... H01R 13/052; H01R 13/33; H01R 12/777; H01R 12/59; H01R 12/65; H05K 1/18
USPC ....................................... 439/67, 77, 78, 492
See application file for complete search history.

(56) References Cited

U.S. PATENT DOCUMENTS 10,868,380 B1 * 12/2020 Komoto ............... H01R 12/771
11,646,507 B2 * 5/2023 Carlsson .................. H01R 9/20 439/37
2018/0233854 A1 * 8/2018 Komoto ................. H01R 12/69
2019/0027842 A1 * 1/2019 Hashiguchi ........ H01R 13/2457
2019/0027846 A1 * 1/2019 Hashiguchi ............ H01R 12/78
2020/0052441 A1 * 2/2020 Matsuo ................ H01R 13/642

FOREIGN PATENT DOCUMENTS

EP 3376601 A1 9/2018
EP 3800739 A1 4/2021
JP 2018129244 A 8/2018
JP 2021061225 A 4/2021

* cited by examiner

*Primary Examiner* — Christopher M Koehler
*Assistant Examiner* — Gregory L Mangot
(74) *Attorney, Agent, or Firm* — MUNCY, GEISSLER, OLDS & LOWE, P.C.

(57) ABSTRACT

A connector includes an inner contact inserted in a recessed portion of a plug contact and composed of a bent wire spring, the inner contact having an elastically displaceable contact portion contacting the plug contact and an elastically displaceable pressing portion, part of a connection object having a flexible conductor exposed on at least one surface thereof being sandwiched between the pressing portion and an inner surface of the recessed portion, the inner surface of the recessed portion and the pressing portion contacting a front surface and a rear surface of the connection object, respectively, the plug contact being electrically connected to the flexible conductor directly when the flexible conductor is exposed on the front surface of the connection object, the plug contact being electrically connected to the flexible conductor via the inner contact when the flexible conductor is exposed on the rear surface of the connection object.

11 Claims, 16 Drawing Sheets

CONNECTOR

BACKGROUND OF THE INVENTION

The present invention relates to a connector, particularly to a connector connected to a sheet type connection object having a flexible conductor exposed on at least one surface of the connection object.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a flexible conductor drawn from the electrode.

As a connector of this type, for example, JP 2018-129244 A discloses a connector shown in FIG. 32. This connector includes a housing 2 and a base member 3 that are separately disposed on opposite sides across a flexible substrate 1 to sandwich the flexible substrate 1. A tubular portion 4A of a contact 4 is passed through a contact through-hole 2A of the housing 2, and a flange 4B of the contact 4 is sandwiched between the housing 2 and a flexible conductor 1A exposed on a surface of the flexible substrate 1.

In this state, by pushing the base member 3 toward the housing 2, as shown in FIG. 33, a projection 3A of the base member 3 is inserted into a projection accommodating portion 4C of the contact 4 with the flexible substrate 1 being sandwiched therebetween, and an inner surface of the projection accommodating portion 4C makes contact with the flexible conductor 1A with a predetermined contact force, whereby the contact 4 is electrically connected to the flexible conductor 1A.

In addition, as shown in FIG. 32, the housing 2 and the base member 3 are fixed to each other by press-fitting a housing fixing post 3B, which is formed to project on the base member 3, into a post accommodating portion 2B of the housing 2.

When a wearable device is fitted with the connector disclosed in JP 2018-129244 A, the wearable device can be connected to an electrode formed of a flexible conductor.

However, when the flexible conductor 1A is exposed on the rear surface of the flexible substrate 1, the connector of JP 2018-129244A is useless for electrically connecting the flexible conductor 1B to the contact 4, disadvantageously.

SUMMARY OF THE INVENTION

The present invention has been made to solve the foregoing problem and aims at providing a connector that enables to make an electrical connection of a contact to a flexible conductor of a connection object regardless of whether the flexible conductor is exposed on the front surface or the rear surface of the connection object.

A connector according to the present invention comprises:

a plug contact having a tubular shape and conductivity, the plug contact including a recessed portion extending along a fitting axis; and an inner contact having conductivity, the inner contact being inserted in the recessed portion and composed of a bent wire spring, wherein the inner contact includes a contact portion that is elastically displaceable in a direction orthogonal to the fitting axis and makes contact with the plug contact in the recessed portion, and a pressing portion that is elastically displaceable in the direction orthogonal to the fitting axis and is disposed in the recessed portion, and wherein part of a connection object of sheet shape having a flexible conductor exposed on at least one surface of the connection object is sandwiched between the pressing portion and an inner surface of the recessed portion in the direction orthogonal to the fitting axis, the inner surface of the recessed portion makes contact with a front surface of the connection object, and the pressing portion makes contact with a rear surface of the connection object, whereby the plug contact is electrically connected to the flexible conductor directly when the flexible conductor is exposed on the front surface of the connection object, and the plug contact is electrically connected to the flexible conductor via the inner contact when the flexible conductor is exposed on the rear surface of the connection object.

DETAILED DESCRIPTION OF THE INVENTION

Embodiments of the present invention are described below based on the accompanying drawings.

Embodiment 1

Figure 1:
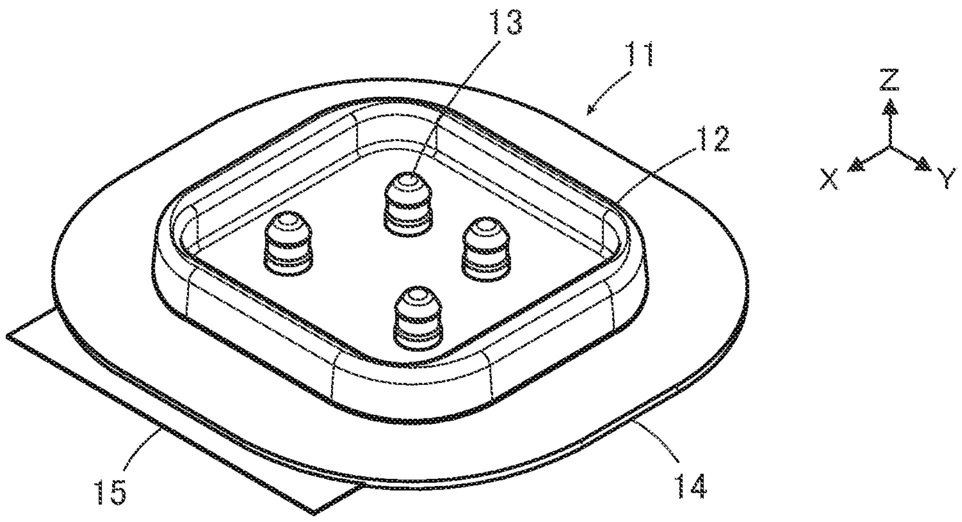
FIG. 1 is a perspective view showing a connector according to Embodiment 1.

FIG. 1 shows a connector 11 according to Embodiment 1. The connector 11 is used as, for example, a garment-side connector for fitting a wearable device, and has a housing 12 made of an insulating material. In the housing 12, four plug contacts 13 are retained, and a reinforcement sheet 14 and a sheet type conductive member 15 are retained by the housing 12 while being superposed on each other. The sheet type conductive member 15 constitutes a connection object that is connected to the contact 11.

The four plug contacts 13 are disposed to project perpendicularly to the sheet type conductive member 15 in two lines parallel to each other.

For convenience, the reinforcement sheet 14 and the sheet type conductive member 15 are defined as extending along an XY plane, the direction in which the four plug contacts 13 are aligned is referred to as "Y direction," and the direction in which the four plug contacts 13 project is referred to as "+Z direction." The Z direction is a fitting direction in which the connector 11 is fitted to a counter connector.

Figure 2:
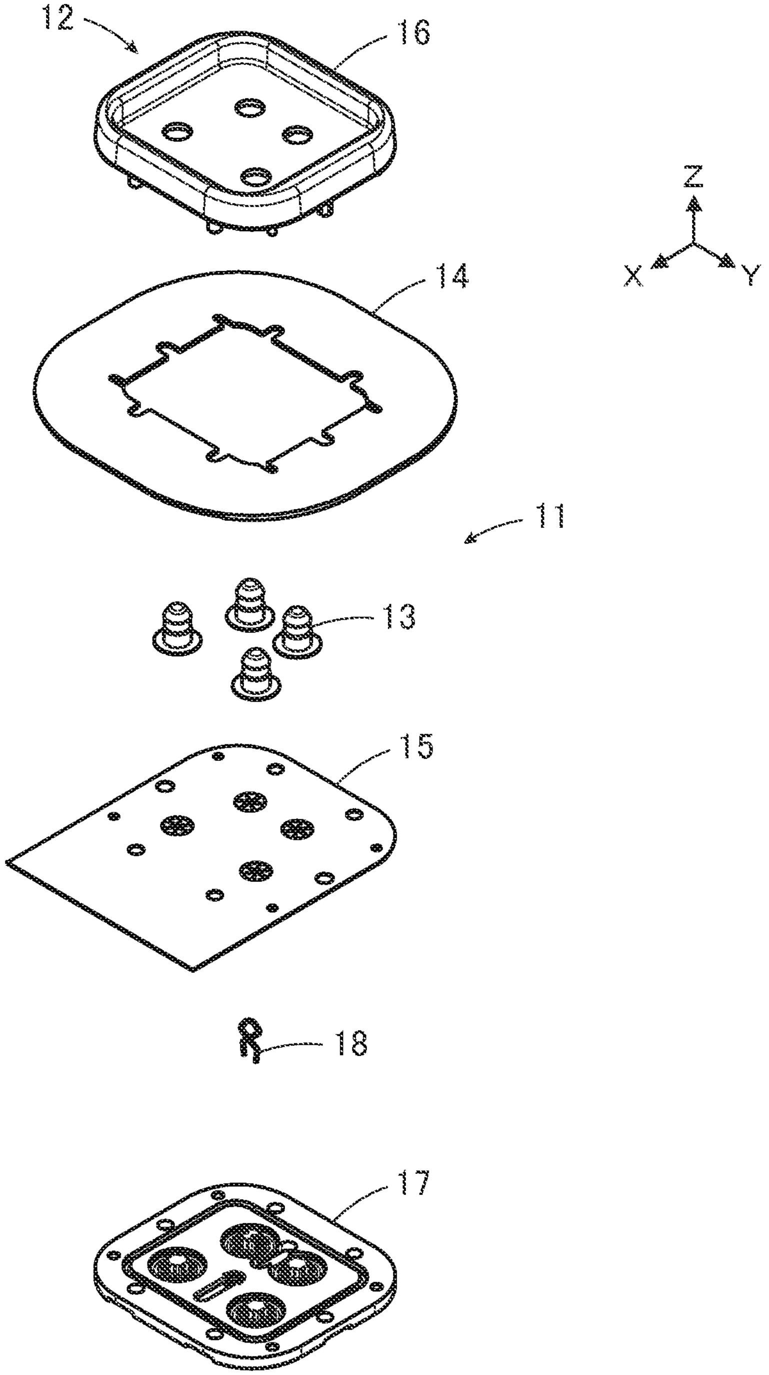
FIG. 2 is an exploded perspective view of the connector according to Embodiment 1.

FIG. 2 is an exploded perspective view of the connector 11. The connector 11 includes a top insulator 16 and a bottom insulator 17, and these top and bottom insulators 16 and 17 constitute the housing 12.

The reinforcement sheet 14 is disposed on the −Z direction side of the top insulator 16, the four plug contacts 13 are disposed on the −Z direction side of the reinforcement sheet 14, and the sheet type conductive member 15 is disposed on the −Z direction side of the four plug contacts 13. Further, a single inner contact 18 is disposed on the −Z direction side of the sheet type conductive member 15, and the bottom insulator 17 is disposed on the −Z direction side of the inner contact 18. The inner contact 18 corresponds to, of the four plug contacts 13, one plug contact 13 that is situated on the −X direction side and the −Y direction side.

Figure 3:
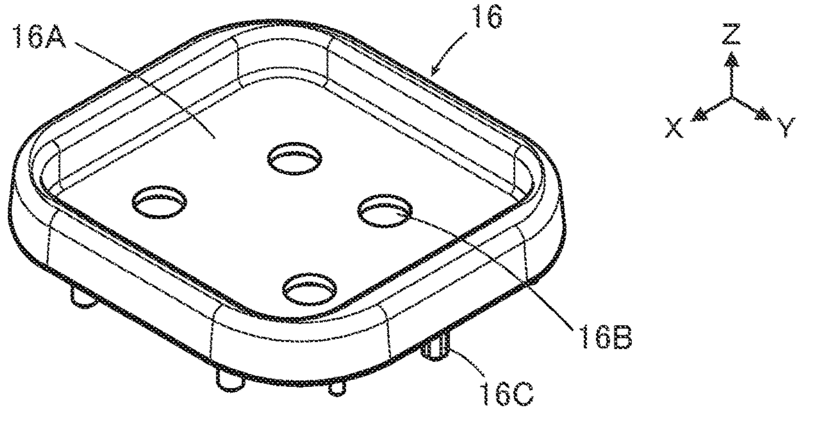
FIG. 3 is a perspective view showing a top insulator used in the connector of Embodiment 1.

As shown in FIG. 3, the top insulator 16 includes a recessed portion 16A opening in the +Z direction, and four contact through-holes 16B formed within the recessed portion 16A. The recessed portion 16A constitutes a counter connector accommodating portion in which part of a counter connector (not shown) is to be accommodated, and the four contact through-holes 16B separately correspond to the four plug contacts 13. In addition, on a surface, facing in the −Z direction, of the top insulator 16, a plurality of bosses 16C are formed to project in the −Z direction.

Figure 4:
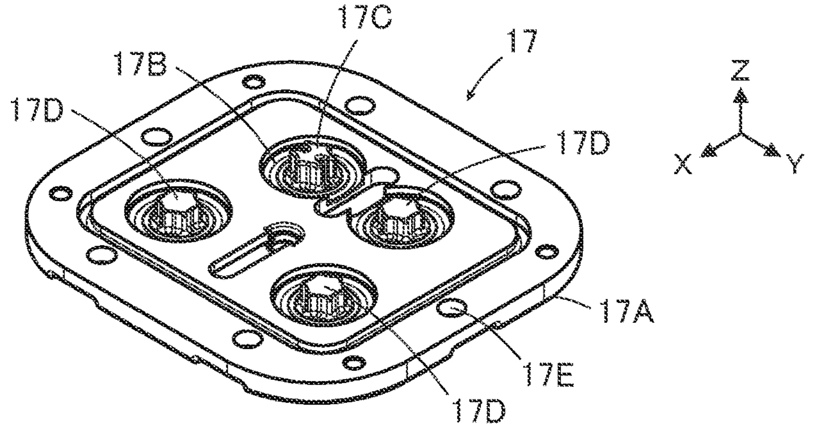
FIG. 4 is a perspective view showing a bottom insulator used in the connector of Embodiment 1.

As shown in FIG. 4, the bottom insulator 17 includes a flat plate portion 17A, and the flat plate portion 17A is provided with four circular recessed portions 17B opening in the +Z direction. The four recessed portions 17B separately correspond to the four plug contacts 13. Of the four recessed portions 17B, one recessed portion 17B situated on the −X direction side and −Y direction side is provided with a projection 17C projecting in the +Z direction, and the other three recessed portions 17B are separately provided with three projections 17D projecting in the +Z direction.

In addition, the flat plate portion 17A is provided with a plurality of through-holes 17E separately corresponding to the plurality of bosses 16C of the top insulator 16.

Figure 5:
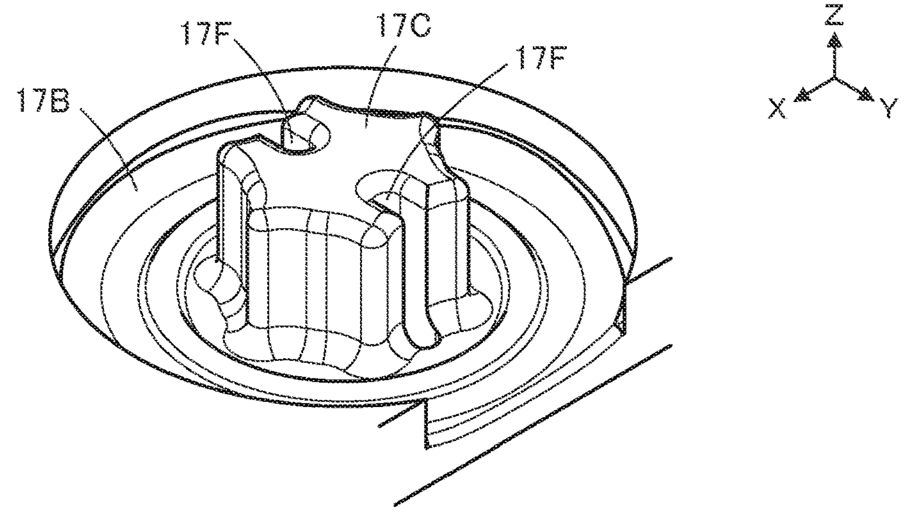
FIG. 5 is an enlarged view of a main part of FIG. 4.

As shown in FIG. 5, the projection 17C formed in the recessed portion 17B situated on the −X direction side and the −Y direction side of the bottom insulator 17 has a substantially regular hexagonal prism shape extending in the Z direction. A pair of grooves 17F extending in the Z direction are separately formed in lateral surfaces, facing in the +Y and −Y directions, of the projection 17C, and form a retaining portion for retaining the inner contact 18.

The projections 17D formed in the other three recessed portions 17B have the same structure as that of the projection 17C except that each of the projections 17D does not have the pair of grooves 17F.

The four plug contacts 13 are each made of a conductive material such as metal, and are to be connected to corresponding contacts of a counter connector (not shown) when part of the counter connector is accommodated in the recessed portion 16A of the top insulator 16.

Figure 6:
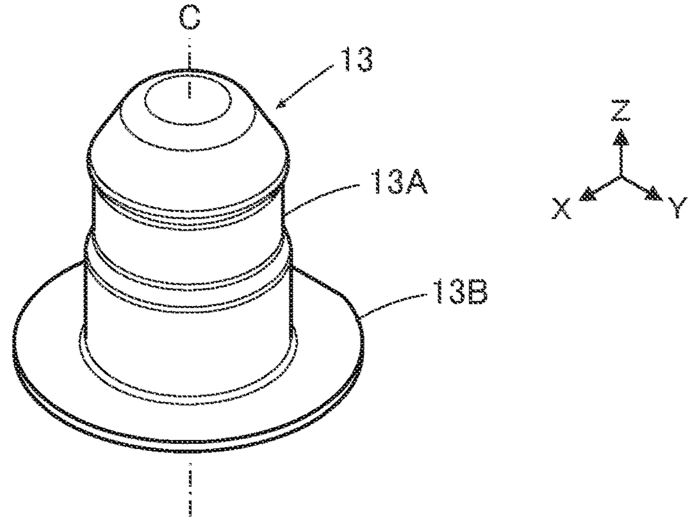
FIG. 6 is a perspective view showing a plug contact used in the connector of Embodiment 1.
Figure 7:
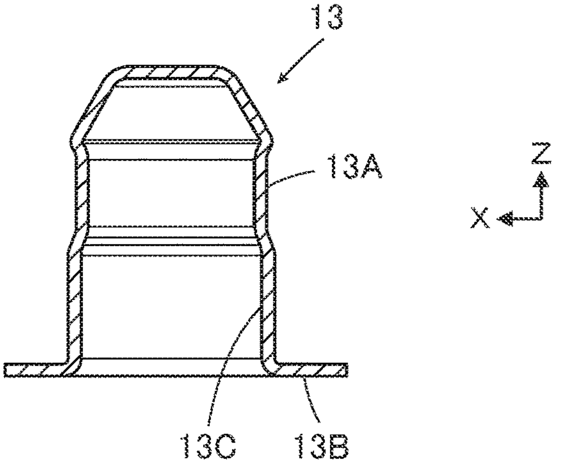
FIG. 7 is a cross-sectional view showing the plug contact used in the connector of Embodiment 1.

As shown in FIG. 6, the plug contact 13 has a tubular portion 13A of cylindrical shape extending along a fitting axis C in the Z direction, and a flange 13B extending from a −Z directional end portion of the tubular portion 13A along an XY plane. In addition, as shown in FIG. 7, the tubular portion 13A is provided in its interior with a recessed portion 13C opening in the −Z direction.

Of the four plug contacts 13, one plug contact 13 situated on the −X direction side and the −Y direction side is connected to a ground potential and used as a shield terminal, and the remaining three plug contacts 13 are each used as a signal terminal for transmitting an electric signal.

Figure 8:
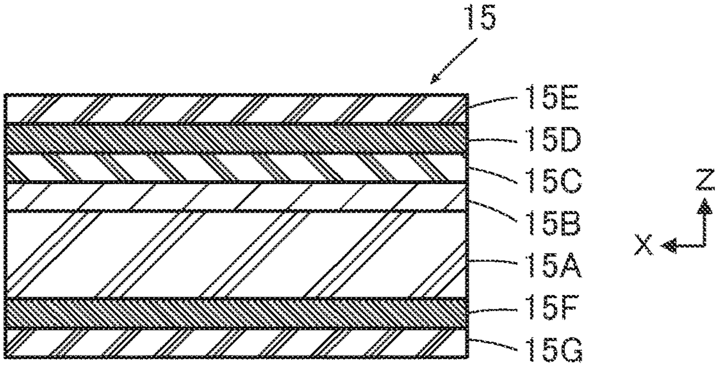
FIG. 8 is a cross-sectional view showing a connection object that is connected to the connector of Embodiment 1.

As shown in FIG. 8, the sheet type conductive member 15 includes a sheet body 15A made of an insulating material and has a multilayer structure in which: a signal wiring layer 15B formed from a flexible conductor, an insulating layer 15C, a shield layer 15D formed from a flexible conductor, and an insulating layer 15E are sequentially laminated on a front surface, facing in the +Z direction, of the sheet body 15A; and a shield layer 15F formed from a flexible conductor, and an insulating layer 15G are sequentially laminated on a rear surface, facing in the −Z direction, of the sheet body 15A.

Figure 9:
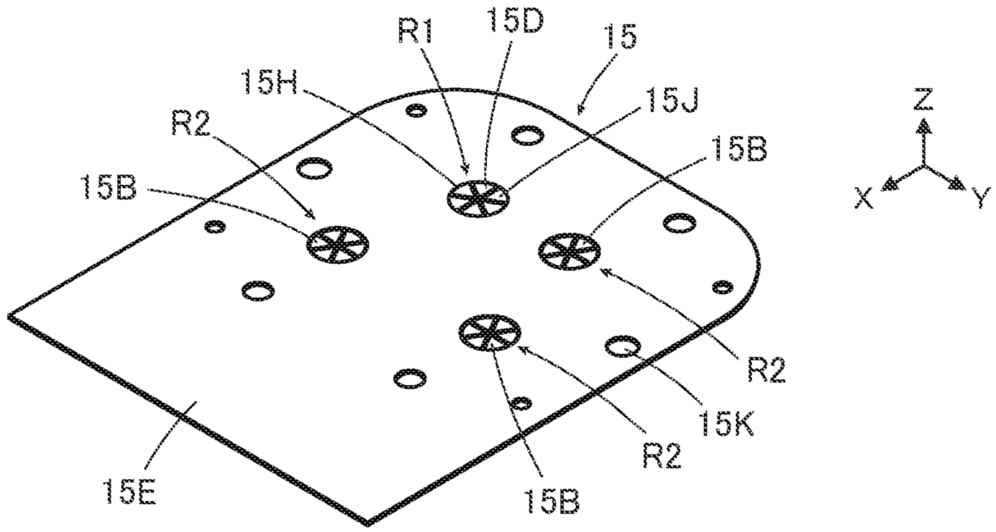
FIG. 9 is a perspective view of the connection object that is connected to the connector of Embodiment 1, as viewed from an obliquely upper position.

As shown in FIG. 9, four contact arrangement regions 15H for separately arranging the four plug contacts 13 are laid out on a front surface, facing in the +Z direction, of the sheet type conductive member 15. Of the four contact arrangement regions 15H, one contact arrangement region 15H situated on the −X direction side and the −Y direction side forms a region R1 on which the plug contact 13 used as a shield terminal is to be arranged, and the remaining three contact arrangement regions 15H separately form regions R2 on which the plug contacts 13 used as signal terminals are to be arranged.

In the region R1 on which the plug contact 13 serving as a shield terminal is to be arranged, the insulating layer 15E is removed so that the shield layer 15D is exposed toward the +Z direction. In each of the regions R2 on which the three plug contacts 13 serving as signal terminals are to be arranged, the insulating layer 15E, the shield layer 15D, and the insulating layer 15C are removed so that the signal wiring layer 15B is exposed toward the +Z direction. In the other region than the regions R1 and R2, the insulating layer 15E is exposed.

In all the regions R1 and R2, a plurality of cuts 15J are formed to penetrate the sheet type conductive member 15 in the Z direction.

Figure 10:
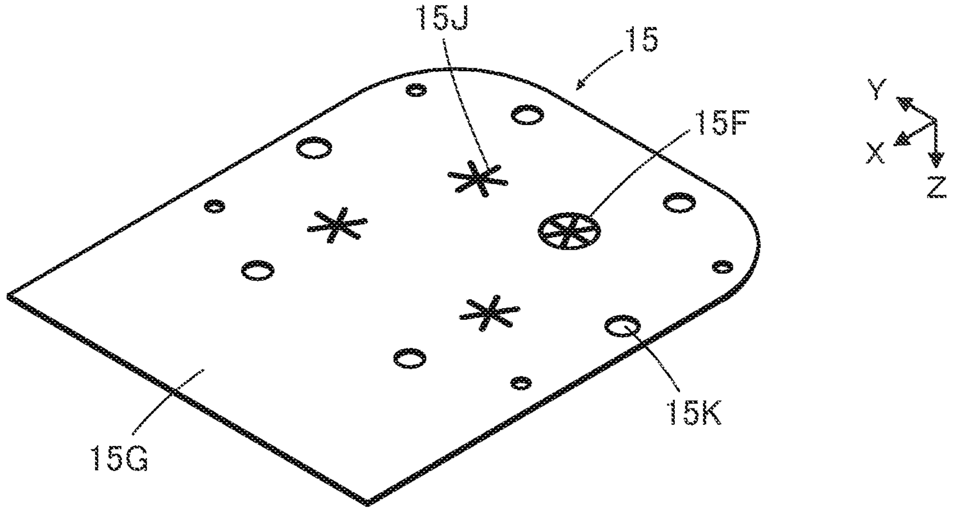
FIG. 10 is a perspective view of the connection object that is connected to the connector of Embodiment 1, as viewed from an obliquely lower position.

Since the cuts 15J penetrate the sheet type conductive member 15 in the Z direction, as shown in FIG. 10, the cuts 15J can be seen also on a rear surface, facing in the −Z direction, of the sheet type conductive member 15 at positions corresponding to the one region R1 and the three regions R2.

On the rear surface, facing in the −Z direction, of the sheet type conductive member 15, only at the position corresponding to the region R1, the insulating layer 15G is removed so that the shield layer 15F is exposed, and in the other regions than the region R1, the insulating layer 15G is exposed.

In addition, a plurality of through-holes 15K separately corresponding to the plurality of bosses 16C of the top insulator 16 are formed at the periphery of the sheet type conductive member 15.

Figure 11:
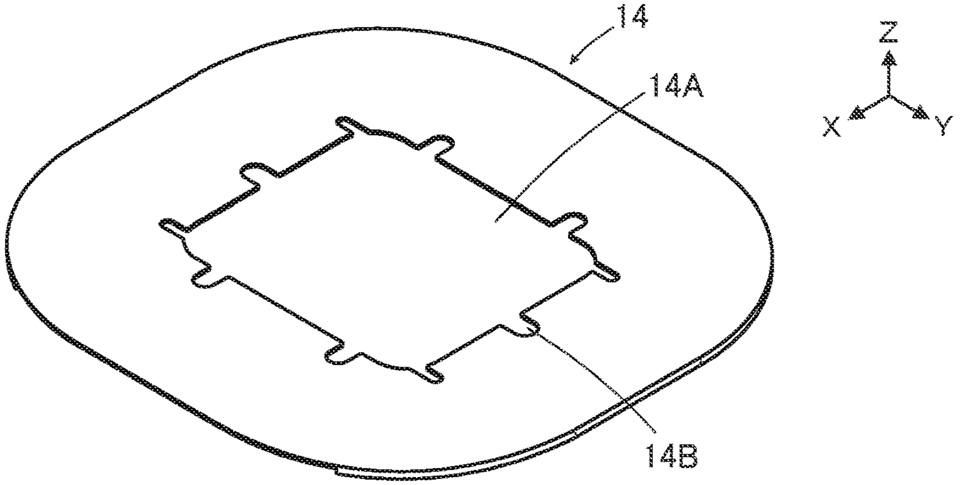
FIG. 11 is a perspective view showing a reinforcement sheet used in the connector of Embodiment 1.

As shown in FIG. 11, the reinforcement sheet 14 is provided to reinforce a mounting object such as a garment (not shown) on which the connector 11 is to be mounted, is made of an insulating material, and has an opening portion 14A formed in the center thereof. Further, a plurality of cutouts 14B separately corresponding to the plurality of bosses 16C of the top insulator 16 are formed along the periphery of the opening portion 14A of the reinforcement sheet 14.

Figure 12:
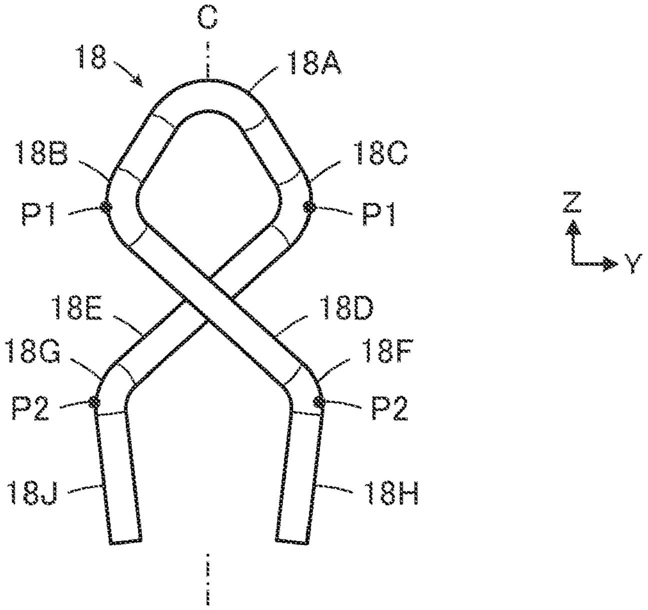
FIG. 12 is a front view showing an inner contact used in the connector of Embodiment 1.
Figure 13:
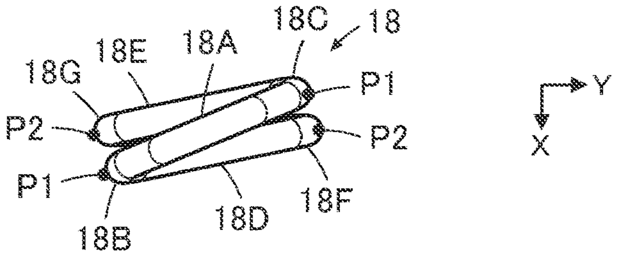
FIG. 13 is a plan view showing the inner contact used in the connector of Embodiment 1.

FIGS. 12 and 13 show the structure of the inner contact 18. The inner contact 18 is constituted of a bent wire spring made of a conductive material such as metal, and includes a horizontal portion 18A extending in the Y direction across the fitting axis C and having opposite ends curved toward the −Z direction.

A first oblique portion 18D and a second oblique portion 18E are joined to −Y and +Y directional end portions of the horizontal portion 18A via a first bent portion 18B and a second bent portion 18C, respectively. The first oblique portion 18D linearly extends from the first bent portion 18B toward the +Y direction and the −Z direction, while the second oblique portion 18E linearly extends from the second bent portion 18C toward the −Y direction and the −Z direction, and these first and second oblique portions 18D and 18E extend obliquely with respect to the fitting axis C while intersecting each other.

Further, a first extending portion 18H and a second extending portion 18J are joined to a tip of the first oblique portion 18D and a tip of the second oblique portion 18E via a third bent portion 18F and a fourth bent portion 18G, respectively. The first extending portion 18H and the second extending portion 18J face each other in the Y direction across the fitting axis C and extend obliquely with respect to the fitting axis C such that the distance therebetween in the Y direction decreases toward the −Z direction.

Outer surfaces, facing in opposite directions from each other, of the first bent portion 18B and the second bent portion 18C form a pair of contact portions P1, and outer surfaces, facing in opposite directions from each other, of the third bent portion 18F and the fourth bent portion 18G form a pair of pressing portions P2.

A distance in the Y direction between the pair of contact portions P1 is set to be slightly larger than an inside diameter of the part of the recessed portion 13C with which the pair of contact portions P1 make contact when the inner contact 18 is inserted into the recessed portion 13C of the plug contact 13.

Therefore, when the inner contact 18 is inserted into the recessed portion 13C of the plug contact 13, the pair of contact portions P1 come into contact with an inner surface of the recessed portion 13C with predetermined contact pressure while being elastically displaced in a direction toward the fitting axis C.

In addition, a distance in the Y direction between the pair of pressing portions P2 is set to be slightly larger than a value obtained by subtracting a double of the thickness of the sheet type conductive member 15 from the inside diameter of the part of the recessed portion 13C with which the pair of pressing portions P2 make contact when the inner contact 18 is inserted into the recessed portion 13C of the plug contact 13.

Therefore, when the inner contact 18 is inserted into the recessed portion 13C of the plug contact 13 while pushing the sheet type conductive member 15 thereinto, the pair of pressing portions P2 is elastically displaced in the direction toward the fitting axis C and presses the sheet type conductive member 15 against the inner surface of the recessed portion 13C with predetermined contact pressure.

Figure 14:
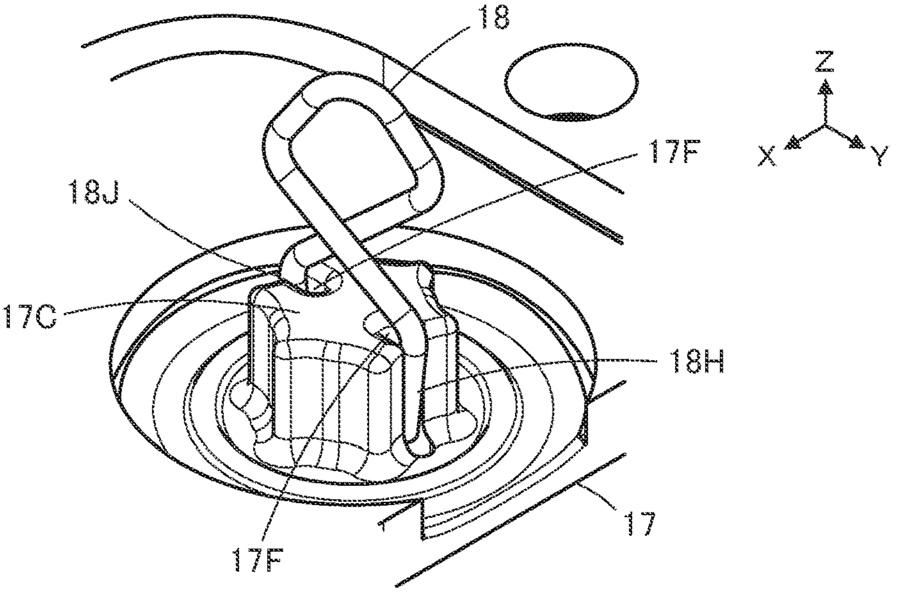
FIG. 14 is a perspective view showing the inner contact in Embodiment 1 retained by the bottom insulator.

As shown in FIG. 14, the inner contact 18 is retained by the bottom insulator 17 by respectively inserting the first extending portion 18H and the second extending portion 18J into the pair of grooves 17F of the projection 17C of the bottom insulator 17.

The four contact through-holes 16B of the top insulator 16, the four plug contacts 13, the four contact arrangement regions 15H of the sheet type conductive member 15, and the four recessed portions 17B of the bottom insulator 17 are arranged so as to align with each other in the Z direction.

The inner contact 18 is arranged so as to align in the Z direction with, of the four contact arrangement regions 15H of the sheet type conductive member 15, the contact arrangement region 15H that forms the region R1 and is situated on the −X direction side and the −Y direction side, and with, of the four recessed portions 17B of the bottom insulator 17, the recessed portion 17B in which the projection 17C is formed and that is situated on the −X direction side and the −Y direction side.

In addition, the bosses 16C of the top insulator 16, the cutouts 14B of the reinforcement sheet 14, the through-holes 15K of the sheet type conductive member 15, and the through-holes 17E of the bottom insulator 17 are arranged so as to align with each other in the Z direction.

When the connector 11 is assembled, first, as shown in FIG. 14, the inner contact 18 is retained by the bottom insulator 17 by respectively inserting the first extending portion 18H and the second extending portion 18J of the inner contact 18 into the pair of grooves 17F of the projection 17C of the bottom insulator 17.

Next, the bosses 16C of the top insulator 16 are separately inserted into the cutouts 14B of the reinforcement sheet 14. At this time, the four contact through-holes 16B of the top insulator 16 are situated within the opening portion 14A of the reinforcement sheet 14.

Further, the tubular portion 13A of each of the plug contacts 13 is inserted from the −Z direction into the corresponding one of the four contact through-holes 16B of the top insulator 16, and the bottom insulator 17 is pressed against the top insulator 16 in the +Z direction with the sheet type conductive member 15 being sandwiched therebetween.

At this time, the flange 13B of each of the plug contacts 13 is situated on the corresponding contact arrangement region 15H of the sheet type conductive member 15, the inner contact 18 retained on the projection 17C of the bottom insulator 17 is inserted into the recessed portion 13C of the corresponding plug contact 13 while pushing the region R1 of the sheet type conductive member 15 thereinto, and the three projections 17D of the bottom insulator 17 are separately inserted into the recessed portions 13C of the corresponding plug contacts 13 while pushing the regions R2 of the sheet type conductive member 15 thereinto.

Since the plurality of cuts 15J are formed in each of the four contact arrangement regions 15H of the sheet type conductive member 15, the inner contact 18 and the three projections 17D are each inserted into the recessed portion 13C of the plug contact 13 while opening the plurality of cuts 15J of the corresponding contact arrangement region 15H.

In addition, by pressing the bottom insulator 17 against the top insulator 16, the bosses 16C of the top insulator 16 sequentially penetrate the cutouts 14B of the reinforcement sheet 14, the through-holes 15K of the sheet type conductive member 15, and the through-holes 17E of the bottom insulator 17. Subsequently, the top insulator 16 and the bottom insulator 17 are fixed to each other through heat deformation of a tip of each of the plurality of bosses 17C projecting on the −Z direction side of the bottom insulator 17. Thus, the assembling operation of the connector 11 is completed.

It should be noted that the flange 13B of each of the plug contacts 13 is sandwiched between the top insulator 16 and the bottom insulator 17 so that the plug contacts 13 are fixed to the top insulator 16 and the bottom insulator 17.

Figure 15:
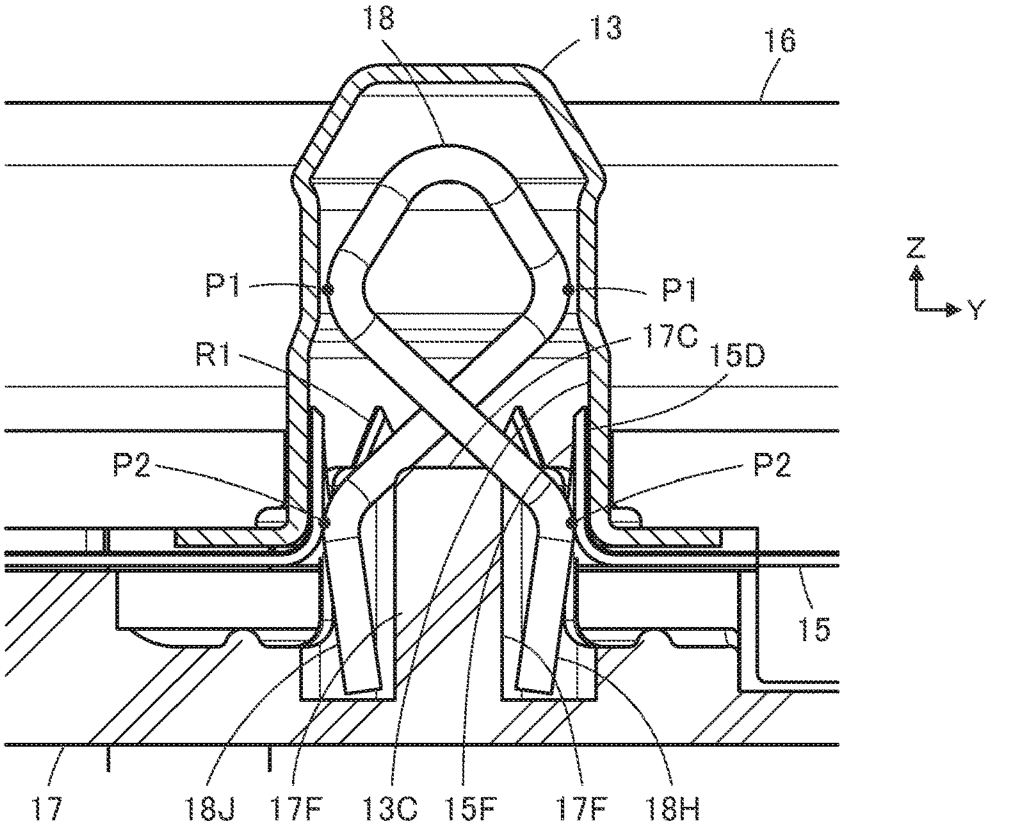
FIG. 15 is a partial cross-sectional view showing a state of an inside of the plug contact in which the inner contact in the connector of Embodiment 1 connected to the connection object is inserted.

As shown in FIG. 15, in the plug contact 13 used as a shield terminal, the inner contact 18 is inserted into the recessed portion 13C of the plug contact 13 while pushing the region R1 of the sheet type conductive member 15 thereinto. Consequently, the pair of contact portions P1 of the inner contact 18 are pressed against the inner surface of the recessed portion 13C of the plug contact 13, whereby the inner contact 18 is electrically connected to the plug contact 13.

In addition, the sheet type conductive member 15 pushed into the recessed portion 13C of the plug contact 13 by the inner contact 18 is pressed against the inner surface of the recessed portion 13C of the plug contact 13 by the pair of pressing portions P2 of the inner contact 18.

Here, as shown in FIGS. 9 and 10, the shield layer 15D is exposed in the region R1 of the front surface of the sheet type conductive member 15 in which the region R1 the plug contact 13 used as a shield terminal is to be arranged, while the shield layer 15F is exposed on the rear surface of the sheet type conductive member 15 at the position corresponding to the region R1.

Therefore, the shield layer 15D on the front surface of the sheet type conductive member 15 makes contact with the inner surface, facing in the Y direction, of the recessed portion 13C of the plug contact 13 with predetermined contact pressure, while the shield layer 15F on the rear surface of the sheet type conductive member 15 makes contact with the pressing portions P2 of the inner contact 18 with predetermined contact pressure.

Consequently, the shield layer 15D exposed on the front surface of the sheet type conductive member 15 is electrically connected to the plug contact 13 directly, while the shield layer 15F exposed on the rear surface of the sheet type conductive member 15 is electrically connected to plug contact 13 via the inner contact 18. That is, both the shield layers 15D and 15F are connected to the plug contact 13 used as a shield terminal.

At this time, since the projection 17C of the bottom insulator 17 on which the inner contact 18 is retained has a substantially regular hexagonal prism shape extending in the Z direction as shown in FIG. 5, the sheet type conductive member 15 is sandwiched also between lateral surfaces of corners of the hexagonal prism and the inner surface of the recessed portion 13C of the plug contact 13. Therefore, the shield layer 15D exposed on the front surface of the sheet type conductive member 15 not only is pressed against the inner surface of the recessed portion 13C of the plug contact 13 by the pair of pressing portions P2 of the inner contact 18, but also makes contact with the inner surface of the recessed portion 13C of the plug contact 13 with predetermined contact pressure by the lateral surfaces of the corners of the projection 17C, and is electrically connected to the plug contact 13.

It should be noted that the projection 17C is not limited to a substantially regular hexagonal prism shape, and may have a columnar shape, for instance.

Thus, with the connector 11, by using the inner contact 18, both the shield layer 15D and the shield layer 15F respectively disposed on the front surface side and the rear surface side of the sheet type conductive member 15 can be electrically connected to the single plug contact 13 arranged in the region R1.

Figure 16:
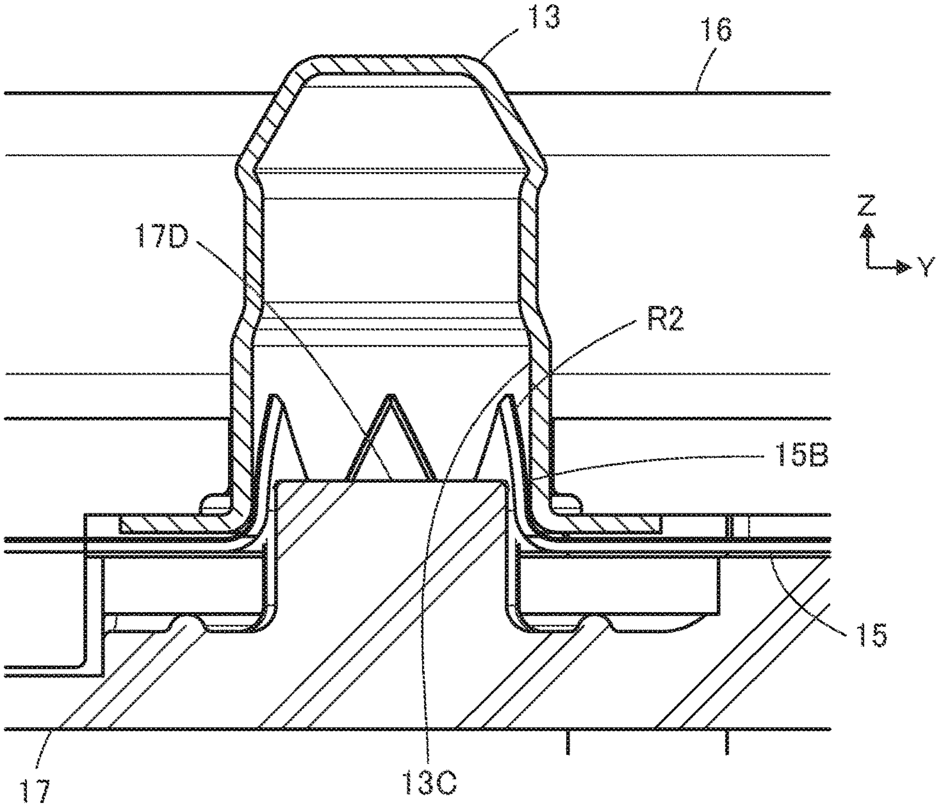
FIG. 16 is a partial cross-sectional view showing a state of an inside of the plug contact in which a projection in the connector of Embodiment 1 connected to the connection object is inserted.

On the other hand, of the four contact arrangement regions 15H laid out on the front surface of the sheet type conductive member 15, in the three regions R2 in which the three plug contacts 13 used as signal terminals are to be arranged, as shown in FIG. 16, the projection 17D of the bottom insulator 17 is inserted into the recessed portion 13C of the plug contact 13 while pushing the region R2 of the sheet type conductive member 15 thereinto. Here, since the signal wiring layer 15B is exposed in the region R2 of the front surface of the sheet type conductive member 15 as shown in FIG. 9, the sheet type conductive member 15 is sandwiched between a lateral surface of the projection 17D and the inner surface of the recessed portion 13C of the contact 13, and the signal wiring layer 15B makes contact with the inner surface of the recessed portion 13C of the plug contact 13 with predetermined contact pressure and is electrically connected to the plug contact 13 arranged in the region R2.

It should be noted that predetermined patterning is applied to the signal wiring layer 15B, and the three plug contacts 13 arranged in the three regions R2 are separately connected to three wirings each formed of the signal wiring layer 15B and insulated from one another.

As shown in FIG. 8, since the signal wiring layer 15B is disposed between the shield layer 15D and the shield layer 15F while being insulated from the shield layer 15D and the shield layer 15F respectively disposed on the front surface side and the rear surface side of the sheet type conductive member 15, a shield effect with respect to the signal wiring layer 15B is exhibited when the plug contact 13 arranged in the region R1 and connected to the shield layer 15D and the shield layer 15F is connected to a ground potential, and it is possible to carry out highly accurate signal transmission with reduced influence of external disturbances caused by, for example, electromagnetic waves.

While the reinforcement sheet 14 is disposed between the bottom insulator 17 and the top insulator 16 in the connector 11 of Embodiment 1, the reinforcement sheet 14 may be omitted when it is not necessary to reinforce a mounting object such as a garment to which the connector 11 is to be attached.

Embodiment 2

Figure 17:
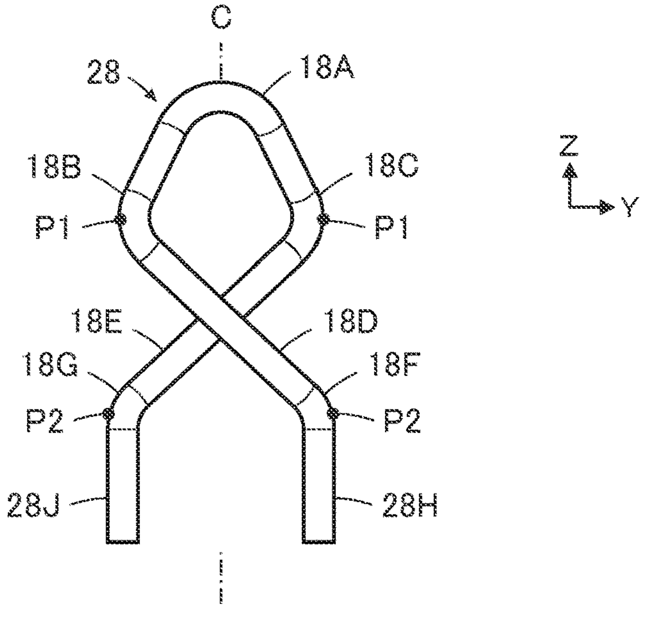
FIG. 17 is a front view showing an inner contact in Embodiment 2.

FIG. 17 shows an inner contact 28 used in a connector according to Embodiment 2. This inner contact 28 includes a first extending portion 28H and a second extending portion 28J extending in parallel to each other along the fitting axis C in place of the first extending portion 18H and the second extending portion 18J extending obliquely with respect to the fitting axis C in the inner contact 18 used in Embodiment 1 and shown in FIG. 12, and otherwise has a similar configuration to that of the inner contact 18.

That is, the inner contact 28 includes the horizontal portion 18A, the first oblique portion 18D and the second oblique portion 18E joined to the −Y and +Y directional end portions of the horizontal portion 18A via the first bent portion 18B and the second bent portion 18C, respectively, and the first extending portion 28H and the second extending portion 28J are joined to the tip of the first oblique portion 18D and the tip of the second oblique portion 18E via the third bent portion 18F and the fourth bent portion 18G, respectively. As with the inner contact 18, the outer surfaces, facing in opposite directions to each other, of the first bent portion 18B and the second bent portion 18C form the pair of contact portions P1, while the outer surfaces, facing in opposite directions to each other, of the third bent portion 18F and the fourth bent portion 18G form the pair of pressing portions P2.

As with the inner contact 18 in Embodiment 1, this inner contact 28 can also be retained by the bottom insulator 17 by respectively inserting the first extending portion 28H and the second extending portion 28J into the pair of grooves 17F of the projection 17C shown in FIG. 5.

Even when the inner contact 28 shown in FIG. 17 is used in place of the inner contact 18 in the connector 11 according to Embodiment 1, similarly, both the shield layer 15D and the shield layer 15F respectively disposed on the front surface side and the rear surface side of the sheet type conductive member 15 can be electrically connected to the single plug contact 13 arranged in the region R1.

Embodiment 3

Figure 18:
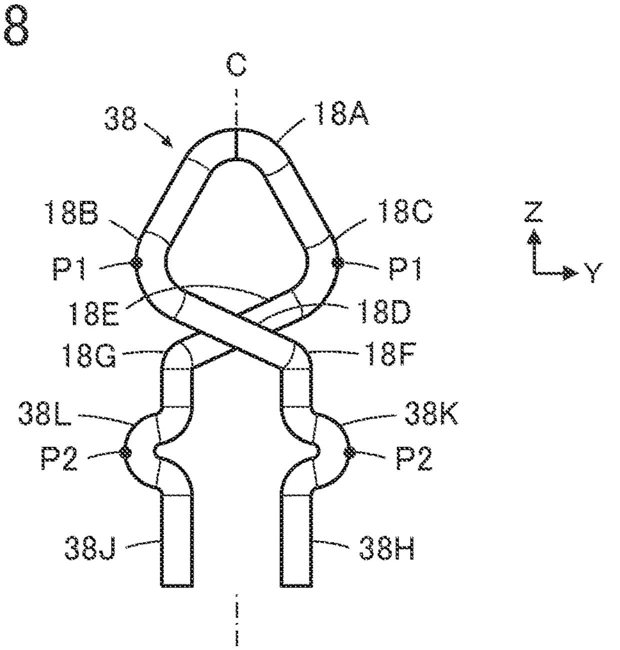
FIG. 18 is a front view showing an inner contact in Embodiment 3.
Figure 19:
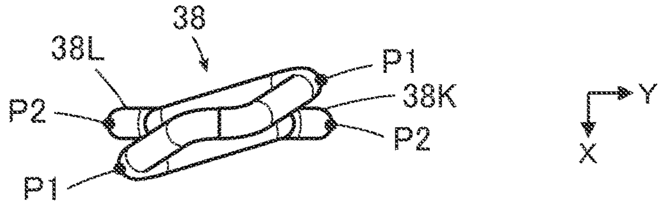
FIG. 19 is a plan view showing the inner contact in Embodiment 3.

FIGS. 18 and 19 show an inner contact 38 used in a connector according to Embodiment 3. This inner contact 38 includes: a first extending portion 38H and a second extending portion 38J extending along the fitting axis C in place of the first extending portion 18H and the second extending portion 18J extending obliquely with respect to the fitting axis C in the inner contact 18 used in Embodiment 1 and shown in FIG. 12; a first projecting portion 38K bent so as to project at an intermediate part of the first extending portion 38H in a direction away from the second extending portion 38J; and a second projecting portion 38L bent so as to project at an intermediate part of the second extending portion 38J in a direction away from the first extending portion 38H, and otherwise has a similar configuration to that of the inner contact 18.

That is, the inner contact 38 includes the horizontal portion 18A, the first oblique portion 18D and the second oblique portion 18E joined to the −Y and +Y directional end portions of the horizontal portion 18A via the first bent portion 18B and the second bent portion 18C, respectively, and the first extending portion 38H and the second extending portion 38J are joined to the tip of the first oblique portion 18D and the tip of the second oblique portion 18E via the third bent portion 18F and the fourth bent portion 18G, respectively. Further, the first projecting portion 38K and the second projecting portion 38L are formed at the intermediate part of the first extending portion 38H and the intermediate part of the second extending portion 38L, respectively.

In the inner contact 38, the outer surfaces, facing in opposite directions to each other, of the first bent portion 18B and the second bent portion 18C form the pair of contact portions P1, while outer surfaces, facing in opposite directions to each other, of the first projecting portion 38K and the second projecting portion 38L form the pair of pressing portions P2.

Figure 20:
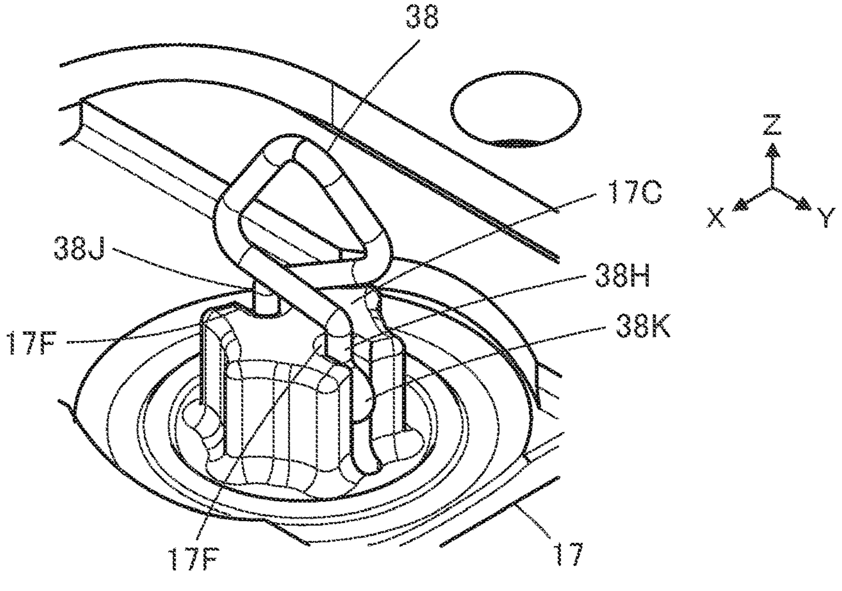
FIG. 20 is a perspective view showing the inner contact in Embodiment 3 retained by the bottom insulator.

As with the inner contact 18 in Embodiment 1, this inner contact 38 can also be retained by the bottom insulator 17 by respectively inserting the first extending portion 38H and the second extending portion 38J into the pair of grooves 17F of the projection 17C as shown in FIG. 20.

Figure 21:
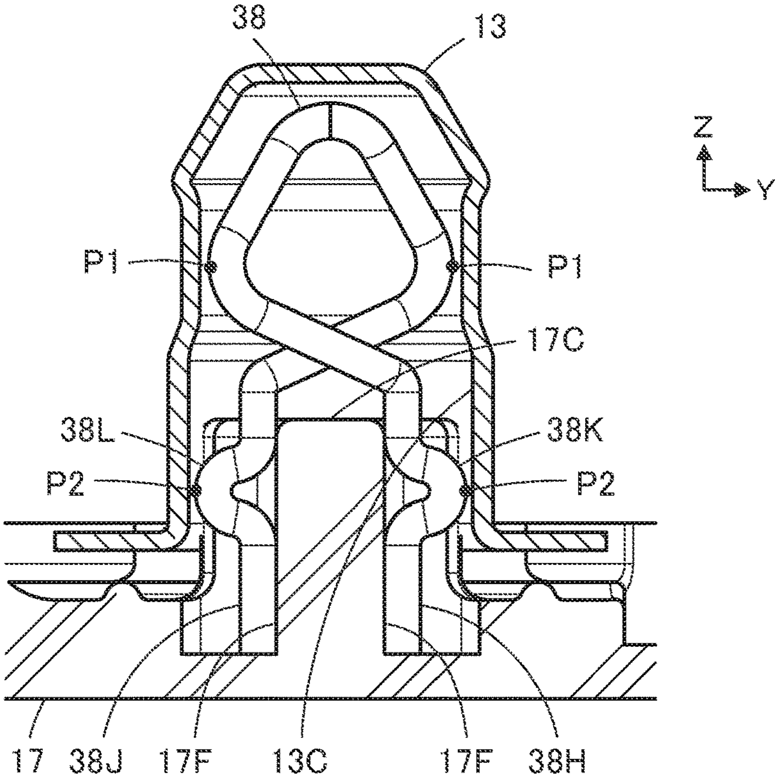
FIG. 21 is a partial cross-sectional view showing a state of an inside of the plug contact in which the inner contact in Embodiment 3 is inserted.

When the inner contact 38 is inserted into the recessed portion 13C of the plug contact 13, as shown in FIG. 21, the pair of contact portions P1 of the inner contact 38 are pressed against the inner surface of the recessed portion 13C of the plug contact 13, whereby the inner contact 38 is electrically connected to the plug contact 13. In addition, each of the pair of pressing portions P2 formed at the first projecting portion 38K and the second projecting portion 38L faces the inner surface of the recessed portion 13C of the plug contact 13.

While the sheet type conductive member 15 is omitted in FIG. 21, when the inner contact 38 is inserted into the recessed portion 13C of the corresponding plug contact 13 while pushing the region R1 of the sheet type conductive member 15 thereinto, the sheet type conductive member 15 pushed into the recessed portion 13C is pressed against the inner surface of the recessed portion 13C of the plug contact 13 by the pair of pressing portions P2 of the inner contact 38.

Thus, even when the inner contact 38 shown in FIGS. 18 and 19 is used in place of the inner contact 18 in the connector 11 according to Embodiment 1, similarly, both the shield layer 15D and the shield layer 15F respectively disposed on the front surface side and the rear surface side of the sheet type conductive member 15 can be electrically connected to the single plug contact 13 arranged in the region R1.

Embodiment 4

Figure 22:
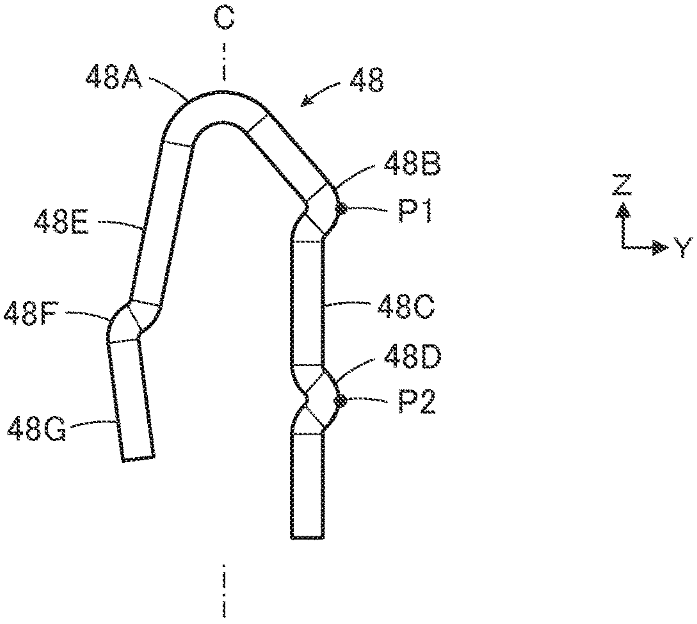
FIG. 22 is a front view showing an inner contact in Embodiment 4.
Figure 23:
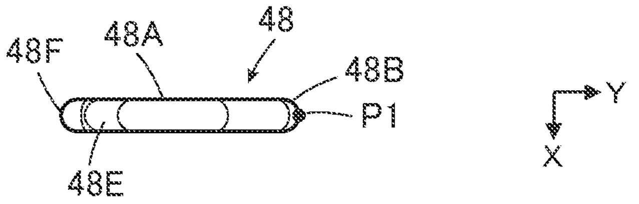
FIG. 23 is a plan view showing the inner contact in Embodiment 4.

FIGS. 22 and 23 show an inner contact 48 used in a connector according to Embodiment 4. This inner contact 48 is composed of a bent wire spring made of a conductive material such as metal, and includes a horizontal portion 48A extending in the Y direction across the fitting axis C and having opposite ends curved toward the −Z direction.

A first extending portion 48C extending along the fitting axis C is joined to a +Y directional end portion of the horizontal portion 48A via a first bent portion 48B, and a first projecting portion 48D is formed at an intermediate part of the first extending portion 48C. In addition, a second extending portion 48E is joined to a −Y directional end portion of the horizontal portion 48A, and a third extending portion 48G is joined to a tip of the second extending portion 48E via a second bent portion 48F.

The first projecting portion 48D projects in the +Y direction to be separated away from the second extending portion 48E.

In addition, the second extending portion 48E is slightly inclined with respect to the fitting axis C to be separated away from the second extending portion 48C toward the −Z direction, while the third extending portion 48G is slightly inclined with respect to the fitting axis C to approach the first extending portion 48C toward the −Z direction.

An outer surface, facing in the +Y direction, of the first bent portion 48B forms a single contact portion P1, while an outer surface, facing in the +Y direction, of the first projecting portion 48D forms a single pressing portion P2. In this manner, the inner contact 48 does not have any portions intersecting each other unlike the inner contacts 18, 28, 38 in Embodiments 1 to 3, and has the only one contact portion P1 and the only one pressing portion P2.

Figure 24:
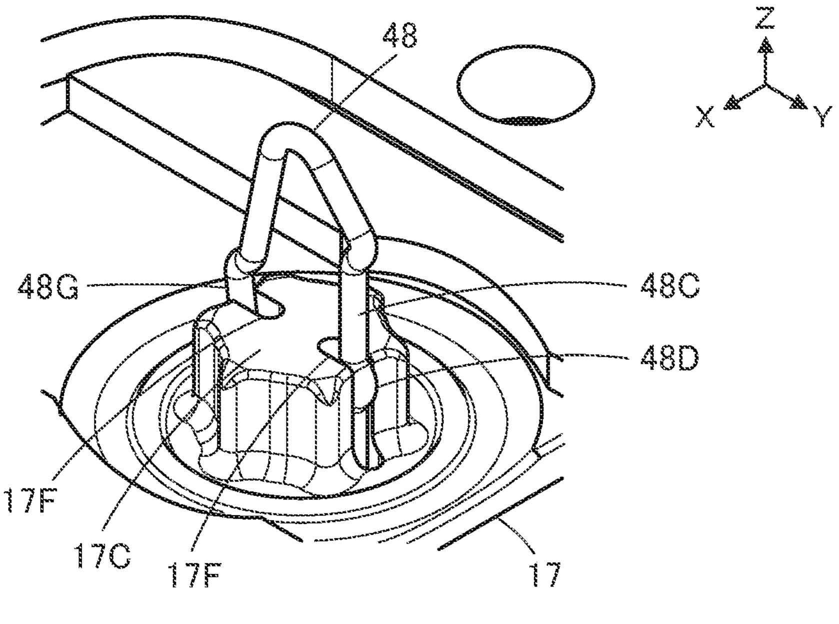
FIG. 24 is a perspective view showing the inner contact in Embodiment 4 retained by the bottom insulator.

As with the inner contact 18 in Embodiment 1, this inner contact 48 can also be retained by the bottom insulator 17 by respectively inserting the first extending portion 48C and the third extending portion 48G into the pair of grooves 17F of the projection 17C as shown in FIG. 24.

Figure 25:
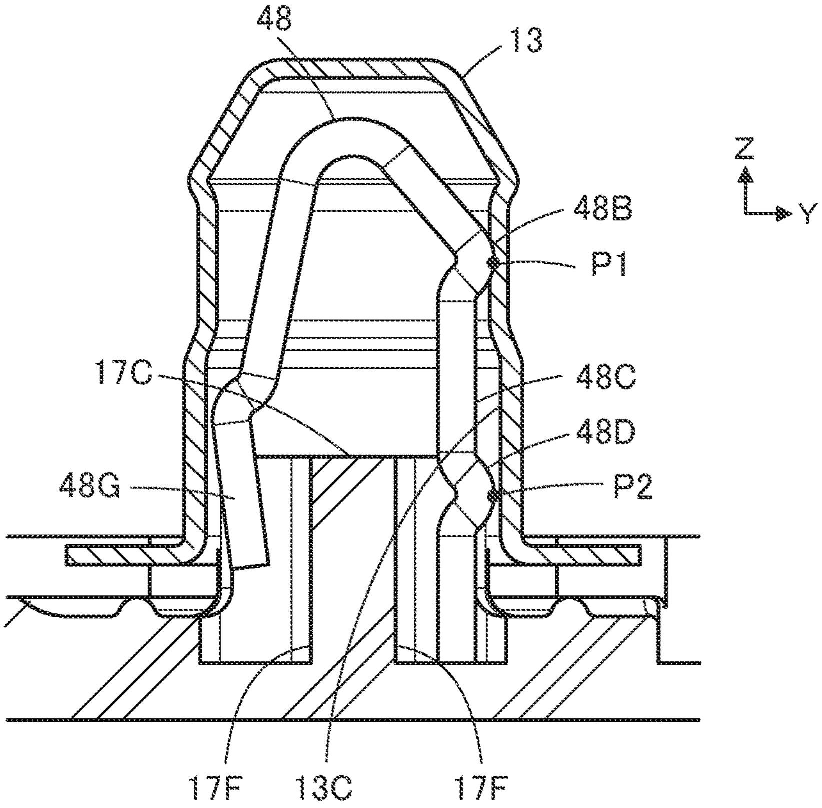
FIG. 25 is a partial cross-sectional view showing a state of an inside of the plug contact in which the inner contact in Embodiment 4 is inserted.

When the inner contact 48 is inserted into the recessed portion 13C of the plug contact 13, the single contact portion P1 formed at the first bent portion 48B comes into contact with the inner surface on the +Y direction side of the recessed portion 13C of the plug contact 13 as shown in FIG. 25, whereby the inner contact 48 is electrically connected to the plug contact 13. In addition, the single pressing portion P2 formed at the first projecting portion 48D faces the inner surface on the +Y direction side of the recessed portion 13C of the plug contact 13.

While the sheet type conductive member 15 is omitted in FIG. 25, when the inner contact 48 is inserted into the recessed portion 13C of the corresponding plug contact 13 while pushing the region R1 of the sheet type conductive member 15 thereinto, the sheet type conductive member 15 pushed into the recessed portion 13C is pressed against the inner surface of the recessed portion 13C of the plug contact 13 by the pressing portion P2 of the inner contact 48.

Thus, even when the inner contact 48 shown in FIGS. 22 and 23 is used in place of the inner contact 18 in the connector 11 according to Embodiment 1, similarly, both the shield layer 15D and the shield layer 15F respectively disposed on the front surface side and the rear surface side of the sheet type conductive member 15 can be electrically connected to the single plug contact 13 arranged in the region R1.

Embodiment 5

Figure 26:
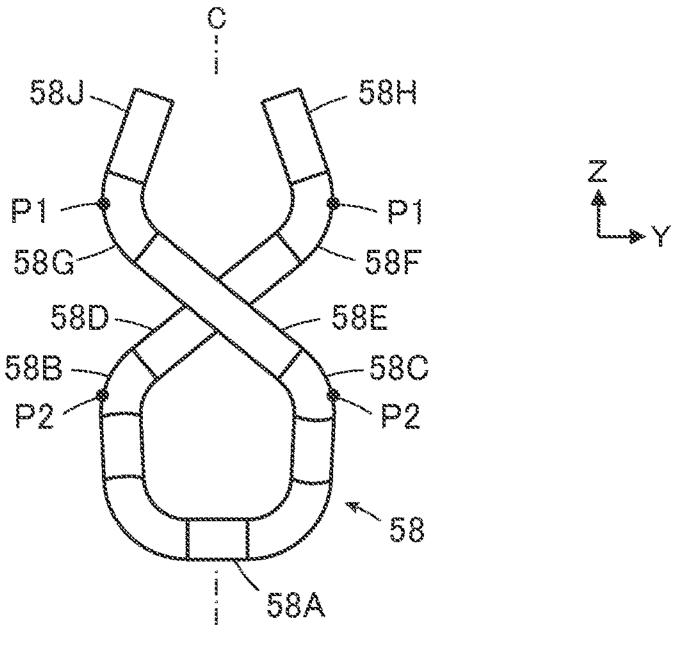
FIG. 26 is a front view showing an inner contact in Embodiment 5.
Figure 27:
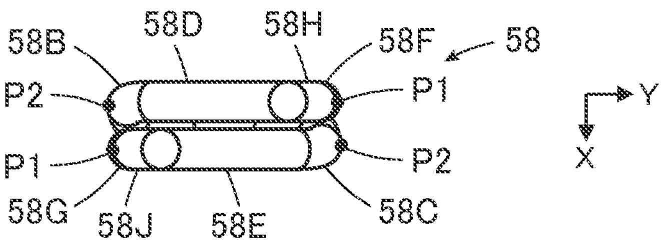
FIG. 27 is a plan view showing the inner contact in Embodiment 5.

FIGS. 26 and 27 show an inner contact 58 used in a connector according to Embodiment 5. This inner contact 58 has a similar shape to that of the inner contact 18 used in Embodiment 1 and shown in FIG. 12 but has a position that is vertically reversed with respect to the inner contact 18.

That is, the inner contact 58 includes a horizontal portion 58A disposed at a −Z directional end portion of the inner contact 58. The horizontal portion 58A extends in the Y direction across the fitting axis C and has opposite ends curved toward the +Z direction, and a first oblique portion 58D and a second oblique portion 58E are joined to −Y and +Y directional end portions of the horizontal portion 58A via a first bent portion 58B and a second bent portion 58C, respectively. The first oblique portion 58D linearly extends from the first bent portion 58B toward the +Y direction and the +Z direction, while the second oblique portion 58E linearly extends from the second bent portion 58C toward the −Y direction and the +Z direction, and these first and second oblique portions 58D and 58E extend obliquely with respect to the fitting axis C while intersecting each other.

Further, a first extending portion 58H and a second extending portion 58J are joined to a tip of the first oblique portion 58D and a tip of the second oblique portion 58E via a third bent portion 58F and a fourth bent portion 58G, respectively. The first extending portion 58H and the second extending portion 58J face each other in the Y direction across the fitting axis C and extend obliquely with respect to the fitting axis C such that the distance therebetween in the Y direction decreases toward the +Z direction, and the first extending portion 58H and the second extending portion 58J are disengaged from each other in the +Z direction.

Outer surfaces, facing in opposite directions to each other, of the third bent portion 58F and the fourth bent portion 58G form the pair of contact portions P1, while outer surfaces, facing in opposite directions to each other, of the first bent portion 58B and the second bent portion 58C form the pair of pressing portions P2.

Figure 28:
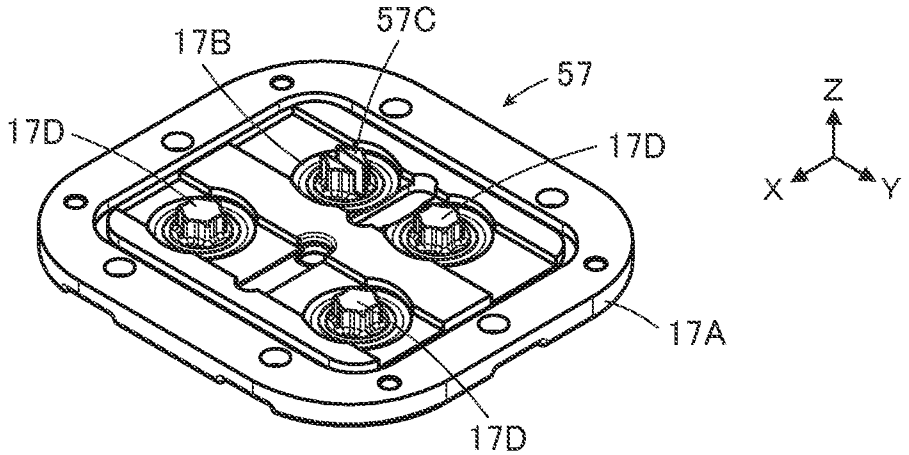
FIG. 28 is a perspective view showing a bottom insulator used in the connector of Embodiment 5.

FIG. 28 shows a bottom insulator 57 used in the connector according to Embodiment 5. The bottom insulator 57 includes a projection 57C in place of the projection 17C in the bottom insulator 17 used in Embodiment 1 and shown in FIG. 4, and otherwise has the same configuration as the bottom insulator 17.

That is, the bottom insulator 57 has the flat plate portion 17A provided with the four circular recessed portions 17B, and of the four recessed portions 17B, one recessed portion 17B situated on the −X direction side and −Y direction side is provided with the projection 57C projecting in the +Z direction, and the other three recessed portions 17B are separately provided with the three projections 17D projecting in the +Z direction.

Figure 29:
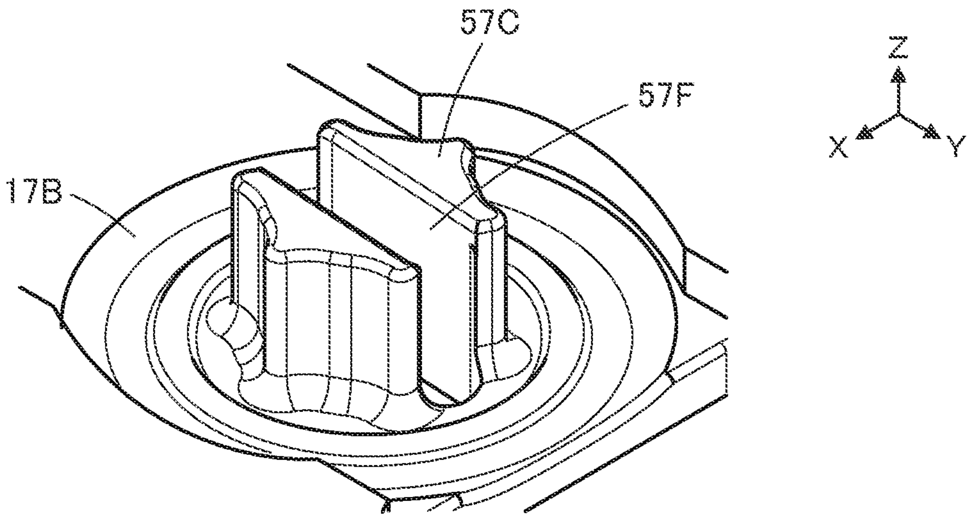
FIG. 29 is an enlarged view of a main part of FIG. 28.

As shown in FIG. 29, the projection 57C has a substantially regular hexagonal prism shape extending in the Z direction and is provided with a groove 57F crossing the projection 57C in the Y direction, and this groove 57F forms a retaining portion for retaining the inner contact 58.

Figure 30:
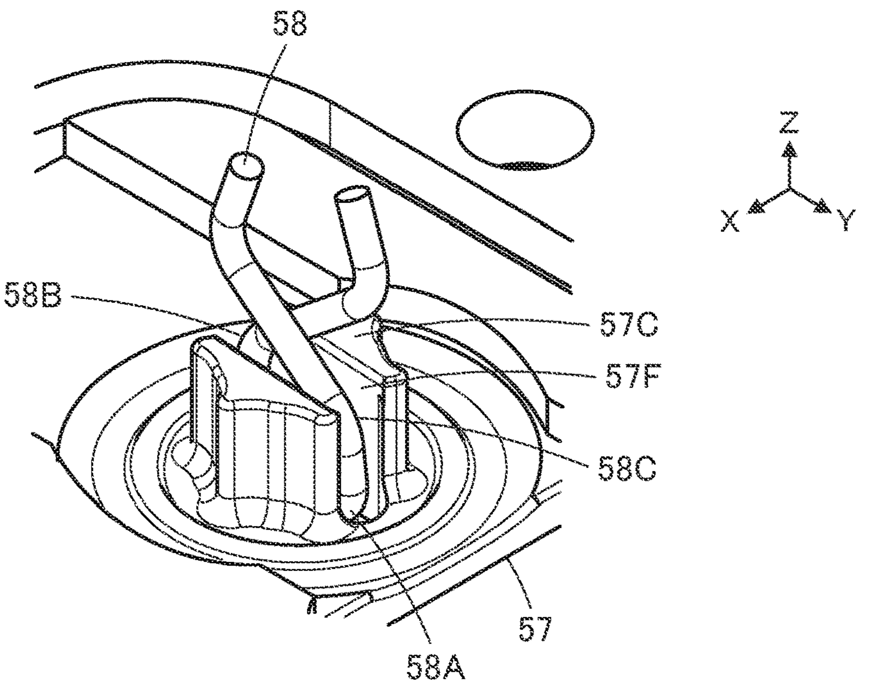
FIG. 30 is a perspective view showing the inner contact in Embodiment 5 retained by the bottom insulator.

As shown in FIG. 30, the inner contact 58 can be retained by the bottom insulator 57 by inserting the horizontal portion 58A, the first bent portion 58B and the second bent portion 58C into the groove 57F of the projection 57C.

Figure 31:
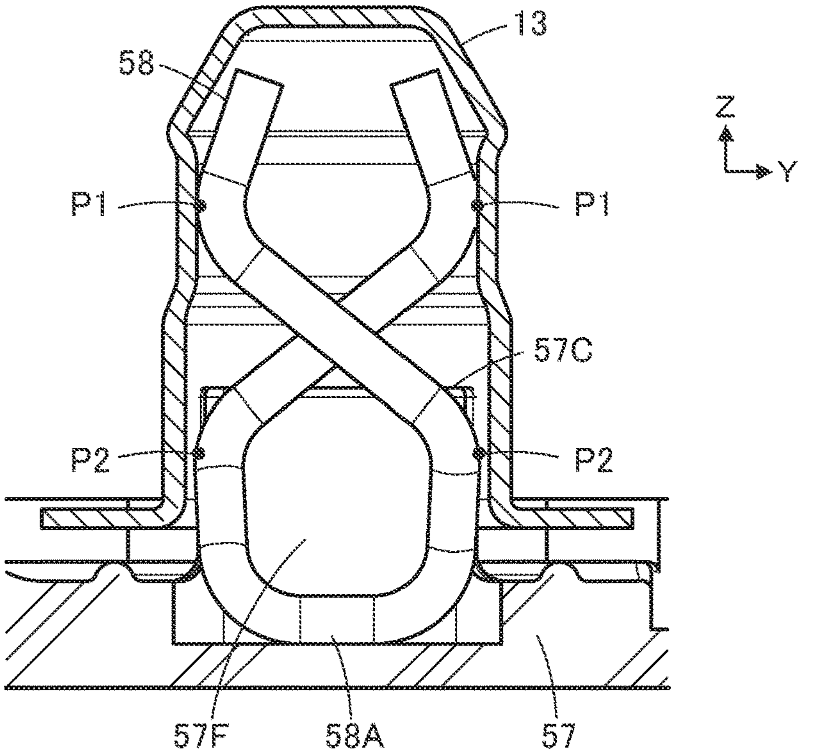
FIG. 31 is a partial cross-sectional view showing a state of an inside of the plug contact in which the inner contact in Embodiment 5 is inserted.
Figure 32:
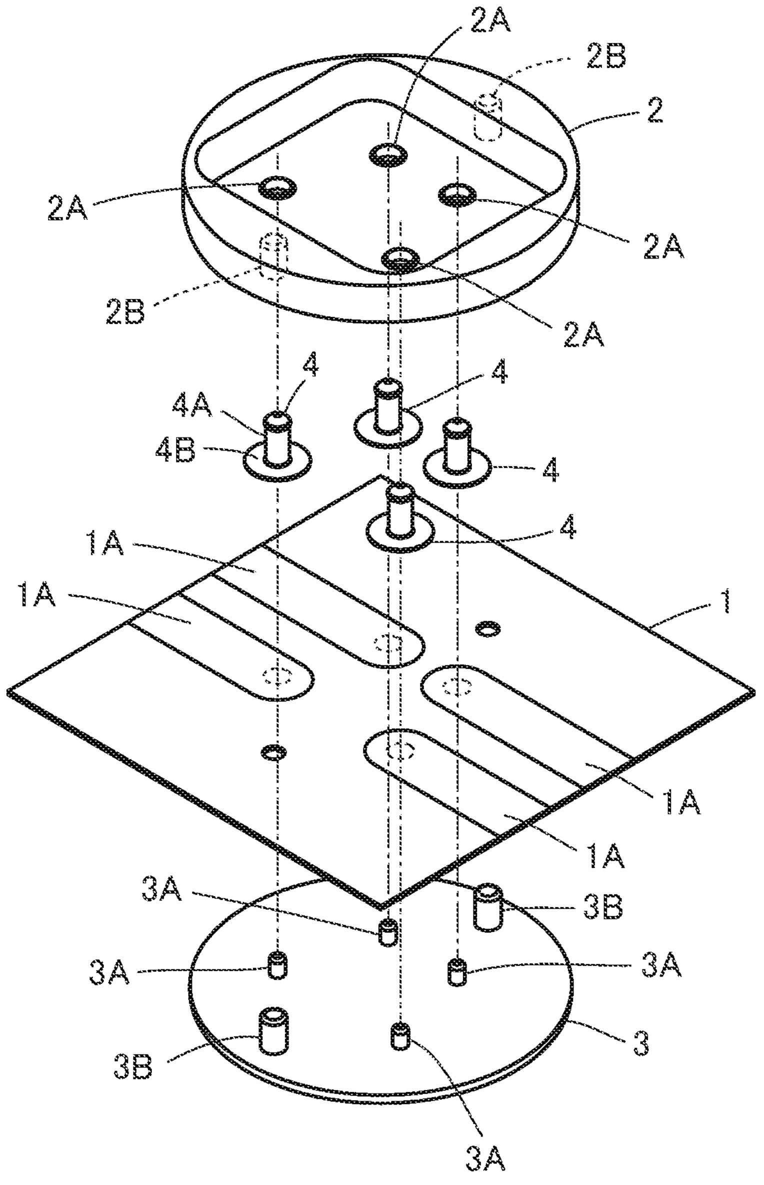
FIG. 32 PRIOR ART
FIG. 32 is an exploded perspective view showing a conventional connector.
Figure 33:
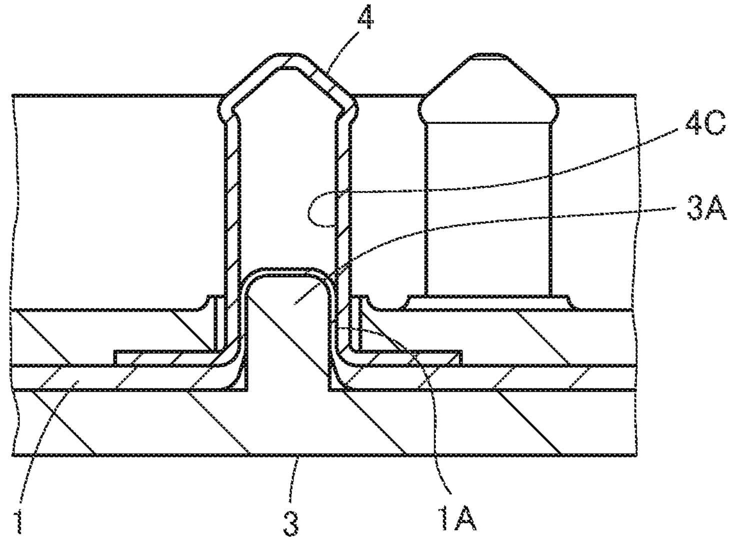
FIG. 33 PRIOR ART
FIG. 33 is a partial cross-sectional view showing the conventional connector.

When the inner contact 58 is inserted into the recessed portion 13C of the plug contact 13, as shown in FIG. 31, the pair of contact portions P1 of the inner contact 58 are pressed against the inner surface of the recessed portion 13C of the plug contact 13, whereby the inner contact 58 is electrically connected to the plug contact 13. In addition, the pair of pressing portions P2 of the inner contact 58 face the inner surface of the recessed portion 13C of the plug contact 13.

While the sheet type conductive member 15 is omitted in FIG. 31, when the inner contact 58 is inserted into the recessed portion 13C of the corresponding plug contact 13 while pushing the region R1 of the sheet type conductive member 15 thereinto, the sheet type conductive member 15 pushed into the recessed portion 13C is pressed against the inner surface of the recessed portion 13C of the plug contact 13 by the pair of pressing portions P2 of the inner contact 58.

Thus, even when the bottom insulator 57 shown in FIG. 28 and the inner contact 58 shown in FIGS. 26 and 27 are used in place of the bottom insulator 17 and the inner contact 18 in the connector 11 according to Embodiment 1, similarly, both the shield layer 15D and the shield layer 15F respectively disposed on the front surface side and the rear surface side of the sheet type conductive member 15 can be electrically connected to the single plug contact 13 arranged in the region R1.

Since in the inner contact 58 in Embodiment 5, the pair of contact portions P1 are respectively formed at the third bent portion 58F and the fourth bent portion 58G respectively joined to the first extending portion 58H and the second extending portion 58J disengaged from each other in the +Z direction, even when a dimension tolerance at the time of manufacturing the inner contact 58 varies, fluctuation in a contact force of the pair of contact portions P1 with respect to the inner surface of the recessed portion 13C of the plug contact 13 can be reduced.

The inner contacts 18, 28, 38, 48, 58 used in Embodiments 1 to 5 above can be easily produced at a low cost by, for example, performing a forming process on a metal wire, without requiring a complex production apparatus.

Also in the case where the sheet type conductive members 15 each serving as a connection object are different in thickness, the inner contacts 18, 28, 38, 48, 58 capable of corresponding to the sheet type conductive members 15 can be easily obtained only by adjusting the forming process.

While the plug contact 13 arranged in the region R1 of the sheet type conductive member 15 is connected to both the shield layer 15D and the shield layer 15F respectively exposed on the front surface side and the rear surface side of the sheet type conductive member 15 in Embodiments 1 to 5 above, only the shield layer 15F exposed on the rear surface side of the sheet type conductive member 15 may be connected to the plug contact 13 arranged in the region R1, for instance.

While the sheet type conductive member 15 used in Embodiments 1 to 5 above has the multilayer structure shown in FIG. 8, the invention is not limited thereto, and it suffices if the sheet type conductive member has a flexible conductor disposed on at least one surface side of the sheet body.

In addition, while the two conductive layers, i.e., the shield layer 15D and the shield layer 15F of the sheet type conductive member 15 are connected to the single plug contact 13 used as a shield terminal in Embodiments 1 to 5 above, the invention is not limited thereto, and three or more conductive layers may be connected to the single plug contact 13.

In addition, while the connector 11 according to Embodiments 1 to 5 above has the four plug contacts 13 including the contact used as a shield terminal and the contacts used as signal terminals, the invention is not limited to this number of plug contacts, and it suffices if the connector includes at least a single plug contact 13 electrically connected to a flexible conductor disposed on the front surface side or the rear surface side of the sheet body of the sheet type conductive member 15.

What is claimed is:

1. A connector comprising:
- a plug contact having a tubular shape and conductivity, the plug contact including a recessed portion extending along a fitting axis; and
- an inner contact having conductivity, the inner contact being inserted in the recessed portion and composed of a bent wire spring,
- wherein the inner contact includes a contact portion that is elastically displaceable in a direction orthogonal to the fitting axis and makes contact with the plug contact in the recessed portion, and a pressing portion that is elastically displaceable in the direction orthogonal to the fitting axis and is disposed in the recessed portion, and
- wherein part of a connection object of sheet shape having a flexible conductor exposed on at least one surface of the connection object is sandwiched between the pressing portion and an inner surface of the recessed portion in the direction orthogonal to the fitting axis, the inner surface of the recessed portion makes contact with a front surface of the connection object, and the pressing portion makes contact with a rear surface of the connection object, whereby the plug contact is electrically connected to the flexible conductor directly when the flexible conductor is exposed on the front surface of the connection object, and the plug contact is electrically connected to the flexible conductor via the inner contact when the flexible conductor is exposed on the rear surface of the connection object.

2. The connector according to claim 1, wherein the inner contact includes:
- a horizontal portion extending across the fitting axis;
- a first oblique portion and a second oblique portion joined to opposite ends of the horizontal portion via a first bent portion and a second bent portion, respectively, and extending obliquely with respect to the fitting axis while intersecting each other; and
- a first extending portion and a second extending portion joined to a tip of the first oblique portion and a tip of the second oblique portion via a third bent portion and a fourth bent portion, respectively, and extending along the fitting axis in a direction away from the horizontal direction while facing each other across the fitting axis.

3. The connector according to claim 2, wherein each of the first bent portion and the second bent portion forms the contact portion, and
- wherein each of the third bent portion and the fourth bent portion forms the pressing portion.

4. The connector according to claim 3, wherein the first extending portion and the second extending portion extend in parallel to each other.

5. The connector according to claim 3, wherein the first extending portion and the second extending portion extend obliquely with respect to the fitting axis such that a distance between the first extending portion and the second extending portion decreases as being farther from the horizontal portion.

6. The connector according to claim 2, wherein the first extending portion has a first projecting portion bent so as to project in a direction away from the second extending portion,
- wherein the second extending portion has a second projecting portion bent so as to project in a direction away from the first extending portion,
- wherein each of the first bent portion and the second bent portion forms the contact portion, and wherein each of the first projecting portion and the second projecting portion forms the pressing portion.

7. The connector according to claim 2, wherein each of the third bent portion and the fourth bent portion forms the contact portion, and wherein each of the first bent portion and the second bent portion forms the pressing portion.

8. The connector according to claim 1, wherein the inner contact includes:

a horizontal portion extending across the fitting axis;

a first extending portion joined to one end of the horizontal portion via a first bent portion and extending along the fitting axis;

a second extending portion extending from another end of the horizontal portion along the fitting axis; and a first projecting portion bent so as to project in a direction away from the second extending portion at an intermediate part of the first extending portion.

9. The connector according to claim 8, wherein the first bent portion forms the contact portion, and wherein the first projecting portion forms the pressing portion.

10. The connector according to claim 1, wherein the plug contact has a tubular portion and a flange that is formed at one end of the tubular portion, and wherein the recessed portion is composed of an inside of the tubular portion.

11. The connector according to claim 10, comprising a housing having insulating properties and configured to retain the connection object, the plug contact, and the inner contact, wherein the housing includes:

a top insulator provided with a contact through-hole that is penetrated by the tubular portion of the plug contact and is smaller than the flange; and a bottom insulator having a retaining portion for retaining the inner contact, and wherein the top insulator is fixed to the bottom insulator such that the tubular portion of the plug contact penetrates the contact through-hole and the connection object and the flange are sandwiched between the top insulator and the bottom insulator.

* * * * *